US009143749B2

(12) United States Patent
Wernersson

(10) Patent No.: US 9,143,749 B2
(45) Date of Patent: Sep. 22, 2015

(54) LIGHT SENSITIVE, LOW HEIGHT, AND HIGH DYNAMIC RANGE CAMERA

(75) Inventor: Mats Wernersson, Helsingborg (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/823,127

(22) PCT Filed: Nov. 25, 2011

(86) PCT No.: PCT/IB2011/055308
§ 371 (c)(1),
(2), (4) Date: Jun. 18, 2013

(87) PCT Pub. No.: WO2013/054160
PCT Pub. Date: Apr. 18, 2013

(65) Prior Publication Data
US 2014/0232900 A1    Aug. 21, 2014

Related U.S. Application Data

(60) Provisional application No. 61/545,711, filed on Oct. 11, 2011.

(51) Int. Cl.
*H04N 9/77*    (2006.01)
*H04N 5/225*    (2006.01)
*H04N 9/093*    (2006.01)

(52) U.S. Cl.
CPC .............. *H04N 9/77* (2013.01); *H04N 5/2251* (2013.01); *H04N 5/2258* (2013.01); *H04N 9/093* (2013.01)

(58) Field of Classification Search
None
See application file for complete search history.

(56) References Cited

U.S. PATENT DOCUMENTS

| 7,718,940 | B2 * | 5/2010 | Hirasawa et al. | 250/201.8 |
|---|---|---|---|---|
| 2005/0276475 | A1 * | 12/2005 | Sawada | 382/167 |
| 2008/0143829 | A1 * | 6/2008 | Takeda | 348/143 |
| 2009/0148149 | A1 | 6/2009 | Chishma | |
| 2010/0073499 | A1 * | 3/2010 | Gere | 348/222.1 |
| 2010/0329356 | A1 * | 12/2010 | Chen et al. | 375/240.25 |
| 2011/0064299 | A1 * | 3/2011 | Zhang et al. | 382/154 |
| 2011/0064327 | A1 * | 3/2011 | Dagher et al. | 382/263 |
| 2011/0074931 | A1 | 3/2011 | Bilbrey et al. | |
| 2011/0134224 | A1 * | 6/2011 | McClatchie | 348/47 |
| 2011/0134292 | A1 * | 6/2011 | Hirai | 348/280 |
| 2011/0242286 | A1 * | 10/2011 | Pace et al. | 348/47 |
| 2011/0285910 | A1 * | 11/2011 | Bamji et al. | 348/631 |
| 2012/0044328 | A1 * | 2/2012 | Gere | 348/48 |
| 2012/0121173 | A1 * | 5/2012 | Aisaka et al. | 382/165 |
| 2012/0127347 | A1 * | 5/2012 | Kim | 348/231.99 |
| 2012/0206581 | A1 * | 8/2012 | Kanamori | 348/68 |
| 2013/0033578 | A1 * | 2/2013 | Wajs | 348/46 |

FOREIGN PATENT DOCUMENTS

JP    2011151798 A    8/2011
WO    2009/097552 A1    8/2009

OTHER PUBLICATIONS

International Search Report and Written Opinion dated Mar. 14, 2012 issued in corresponding PCT application No. PCT/IB2011/055308, 11 pages.

* cited by examiner

*Primary Examiner* — Michael Osinski
(74) *Attorney, Agent, or Firm* — Snyder, Clark, Lesch & Chung, LLP

(57) ABSTRACT

A user device includes a dual array camera in which a first camera includes a first image sensor without a color filter array to capture luminance, and a second camera includes a second image sensor with a color filter array to capture chrominance.

20 Claims, 12 Drawing Sheets

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |
| R | G | R | G | R | G |
| G | B | G | B | G | B |
| R | G | R | G | R | G |
| G | B | G | B | G | B |

Fig. 1A

LIGHT SENSITIVE, LOW HEIGHT, AND HIGH DYNAMIC RANGE CAMERA

BACKGROUND

Various user devices, such as mobile or portable devices, include cameras to allow users to capture images and video. The dimensions of a camera depend on the dimensions of the lens, and the dimensions of the lens are interrelated to the focal length. The focal length depends on, for example, the field of view and the optical format (e.g., size of the sensor).

SUMMARY

According to one aspect, a dual camera may include a first camera and a second camera, wherein the first camera includes a first image sensor to capture luminance, and wherein the first image sensor does not include a color filter array, and the second camera includes a second image sensor to capture chrominance, wherein the second image sensor includes a color filter array.

Additionally, the first camera and the second camera may be separated by a distance approximately between 25 millimeters and 35 millimeters.

Additionally, the first image sensor may include a filter that corrects a difference between the first image sensor's spectral sensitivity and a photopic luminosity function.

Additionally, the user device may comprise an image processor comprising: a memory storing instructions, and a processor to execute the instructions to correlate a luminance image captured by the first camera to a luminance image captured by the second camera, calculate a misalignment between the luminance images, and adjust chrominance data of an image captured by the second camera to correct a parallax.

Additionally, the processor may further execute instructions to identify an occluded area of an image captured by the second camera, identify an area neighboring the occluded area of the image, and use chrominance data of the area neighboring the occluded area to correct for the occluded area.

Additionally, the processor may further execute instructions to apply edge detection to a first image captured by the first camera, identify an obstructed portion of an object in a second image captured by the second camera based on edge detection of the object in the first image, and use chrominance data associated with an unobstructed portion of the object as chrominance data for the obstructed portion of the object.

Additionally, the processor may further execute instructions to identify the unobstructed portion of the object, and use average values of the chrominance data associated with the unobstructed portion of the object.

Additionally, the first camera and the second camera may be separated by a distance of 10 millimeters or less.

Additionally, the user device includes a wireless telephone.

According to another aspect, a method may comprise capturing luminance of an image by a first camera that does not include a color filter array; and capturing chrominance of the image by a second camera that includes a color filter array, wherein a dual camera comprises the first camera and the second camera.

Additionally, the method may comprise correlating a first luminance image to a second luminance image; calculating a misalignment between the first and second luminance images; and adjusting chrominance data of the image captured by the second camera based on the calculating.

Additionally, the method may comprise identifying an occluded area of an image captured by the second camera; identifying an area neighboring the occluded area of the image; and using chrominance data of the area neighboring the occluded area to correct the occluded area.

Additionally, the method may comprise applying edge detection to a first image captured by the first camera; identifying an obstructed portion of an object in a second image captured by the second camera based on edge detection of the object in the first image; and using chrominance data associated with an unobstructed portion of the object as chrominance data for the obstructed portion of the object.

Additionally, the method may comprise identifying the unobstructed portion of the object; and using average values of the chrominance data associated with the unobstructed portion of the object.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings:

FIG. 1A is a diagram illustrating an exemplary Bayer filtering pattern;

DETAILED DESCRIPTION

Figure 1C:
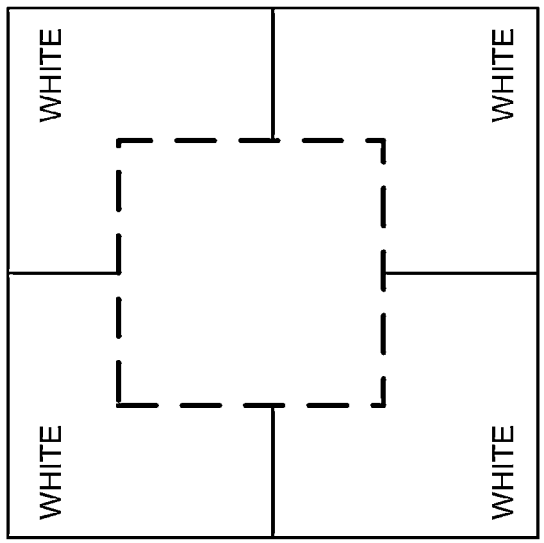
FIG. 1C is a diagram illustrating an exemplary sampling of luminance of a sensor without a color filter array.

The following detailed description refers to the accompanying drawings. The same reference numbers in different drawings may identify the same or similar elements. Also, the detailed description does not limit the invention. Rather the scope of the invention is defined by the appended claims.

According to an exemplary embodiment, a dual camera comprises a first camera having a sensor without a color filter array and a second camera having a sensor with a color filter array. According to another exemplary embodiment, a dual camera comprises a first camera having a sensor with a filter that corrects the difference between the sensor's spectral sensitivity and the photopic luminosity function, and a second camera having a sensor with a color filter array. According to an exemplary embodiment, the color filter array may be implemented as a Bayer filter array, a pseudo-random Bayer filter, a cyan, yellow, green, magenta (CYGM) filter array, a red, green, blue, emerald (RGBE) filter array, a vertical color filter, or other conventional color filter array that provide chrominance information.

According to an exemplary embodiment, the first camera captures the luminance of an image. According to an exemplary embodiment, the second camera captures the chrominance of an image. The second camera may also capture the luminance of an image.

According to an exemplary embodiment, a dual camera comprises an image processing system that corrects parallax and occlusion, which may stem from each camera having its own location. According to an exemplary embodiment, the image processing system corrects parallax based on correlating a luminance image and a chrominance image. According to an exemplary embodiment, the luminance image and the chrominance image are compared. Alternatively, a portion of the luminance image and a portion of the chrominance image are compared. Based on the comparing, the image processing system identifies which blocks or areas of the image need correction for parallax. The image processing system may calculate a misalignment and correct for parallax. For example, one image may be selected as the primary image and the other image may be selected as the secondary image, which is to be corrected.

According to an exemplary embodiment, images are registered to produce occlusions in luminance. According to an exemplary embodiment, the image processing system corrects occlusion by using luminance information from the image captured by the second camera to fill-in missing luminance information, resulting from occlusion, in the image captured by the first camera.

According to another embodiment, images are registered to produce occlusions in chrominance. According to an exemplary embodiment, the image processing system corrects occlusions by using chrominance information. For example, in an occluded area of an image where chrominance information is deficient, but luminance information in the occluded area is the same or nearly the same as a neighboring area (e.g., an area with no occlusion) of the image, the chrominance information of the neighboring area is used for the occluded area.

According to another embodiment, the image processing system may use edge detection to detect an object and portions of objects that are occluded or not occluded in a luminance image and/or a chrominance image. Chrominance information associated with the portion of an object that is not occluded is used for the portion of the object that is occluded.

A typical array camera has 16-25 sub-cameras. However, these array cameras are costly due to the number of cameras. Also, the size of a camera is based on the size of its lens. In this regard, the array camera requires a lens for each camera, which naturally increases the overall size of the array camera. Additionally, the dimensions of a lens are set by the focal length, which depends on the field of view and the optical format. While the dimensions of a lens may be reduced by decreasing the size of the image sensor (e.g., the optical format), such a reduction results in a loss of pixel resolution.

A conventional camera includes an image sensor covered by a color filter array. A typical color filter array is the Bayer filter pattern, as illustrated in FIG. 1A. A single pixel can only record a portion of the light spectrum, such as, red, green, or blue, which is depicted in FIG. 1A as (R) for red, (G) for green, and (B) for blue. The green pixels capture approximately 59% of luminosity perceivable by a person. The red pixels capture approximately 30% and the blue pixels capture approximately 11% of the remaining perceivable luminosity. A person's visual system perceives details, edges, and textures by luminance content only. A person's color perception has much lower spatial resolution than a person's luminance perception.

The high luminance content of the green pixels makes the green pixels important for recording details and sharpness of an image. This is one reason why the Bayer filter arrangement is designed to have 50% green pixels and 25% red and 25% blue pixels.

Figure 1B:
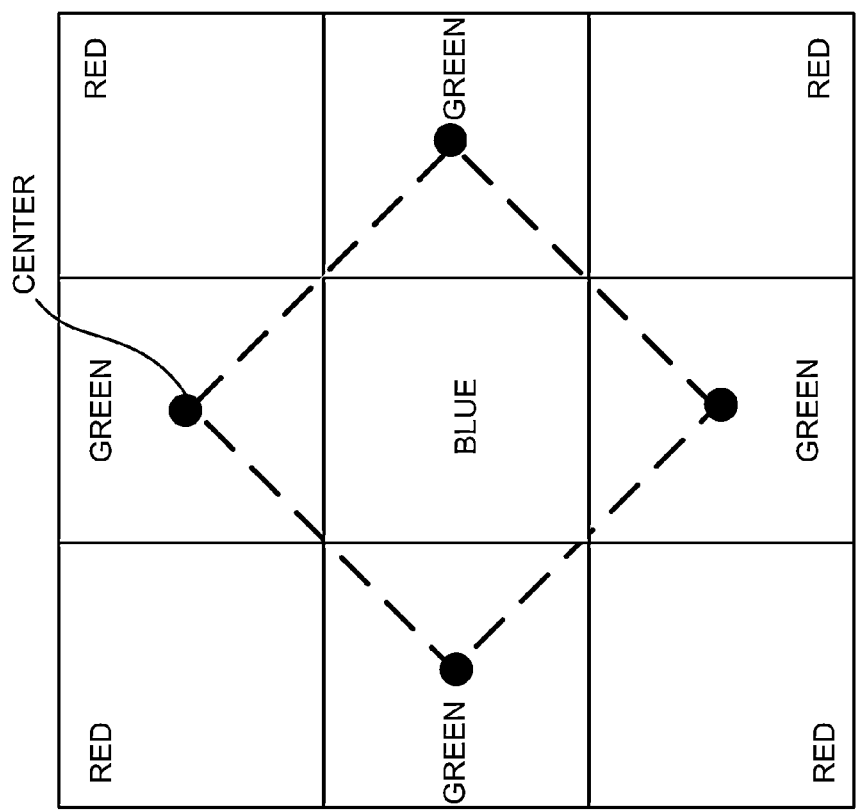
FIG. 1B is a diagram illustrating an exemplary sampling of luminance of a sensor having the Bayer filtering pattern.

As previously described, a dual camera includes a first camera having a sensor without a color filter or a sensor having a filter that corrects the difference between the sensor's spectral sensitivity and the photopic luminosity function, and a second camera having a sensor with a color filter array (e.g., a Bayer pattern sensor, etc.). The limiting spatial resolution of a sensor having, for example, a Bayer pattern is restricted by the spatial sampling frequency of green light. A sensor without a color filter array is restricted, in terms of spatial resolution, by the pixel pitch. For example, referring to FIG. 1B, a sensor having a Bayer pattern samples the luminance of an image at a rate of pixel pitch times $\sqrt{2}$. In FIG. 1C, a sensor without a filter samples luminance at a rate of pixel pitch. Thus, the distance between the centers of green pixels of an image, captured by a camera including a sensor with a Bayer pattern, is $\sqrt{2}$ longer than an image captured by a camera with a sensor without a filter that samples luminance at pixel pitch. Based on this fact, a camera using a sensor without a color filter array should be able to capture an image of $\sqrt{2}$ times higher linear spatial resolution compared to a camera using a sensor with a color filter array. The number of pixels that may be used to capture the same resolution is 50% less. For example, referring to FIG. 1C, the number of white pixels of a sensor without a color filter would be equal to the number of green pixels of a sensor having a Bayer filter pattern, which has twice the number of total pixels.

In view of the above, according to an exemplary embodiment, one of the two cameras of the dual camera may use unfiltered pixels. As a red, green, or blue filter absorbs approximately ⅔ of the visible spectrum, the first camera may provide a gain of up to three times in sensitivity in the pixels that capture luminosity. Additionally, since the number of pixels is reduced by approximately 50%, the first camera may be smaller in size than a camera with a sensor having a color filter array (e.g., a Bayer filter pattern, etc.). The focal length and the optical track will also be reduced by a factor of $\sqrt{2}$. In other words, the optical track is approximately 70% of an optical track of a camera having a Bayer sensor.

Although the first camera is able to capture luminance, another camera is needed to capture color. According to an exemplary embodiment, the dual camera includes a second camera to capture color. For example, the second camera includes a sensor with a color filter array (e.g., a Bayer filter arrangement, etc.). The number of pixels of the second camera may be the same as the first camera. Compared with a conventional camera having twice as many Bayer pixels, the second camera will have lower spatial resolution. However, since the second camera may be used to only capture chrominance, the resolution of the second camera may be sufficient. The second camera may also be used to achieve a high dynamic range.

For example, the exposure time and gain may be adjusted differently between the two cameras, and the result may be combined. According to an exemplary embodiment, the first camera (e.g., without a color filter array) is used to capture darker parts of a scene while the second camera (e.g., with a color filter array) is used to capture the highlights that are saturated in the first camera. Typically, highlights have less detail than medium and dark parts of a scene. For example, a sky with white clouds is typically over-exposed, but can be successfully rendered with a camera having a Bayer sensor pattern since, for example, high spatial resolution is not needed.

Since images of the first camera and the second camera of the dual camera will be combined, this may present various problems. For example, since each camera is located in different positions, objects captured by the first camera and the second camera will also be at different distance relative to the first and second cameras. Objects that are located at different distances from the dual camera may produce some parallax between images.

According to an exemplary embodiment, the dual camera includes an image processing system. The image processing system corrects the parallax. According to an exemplary embodiment, the image processing system selects one image as a primary image and another image as a secondary image. For example, the primary image may be the image captured by the first camera (e.g., a luminance image) and the secondary image may be the image captured by the second camera (e.g., a chrominance image). The image processing system compares the primary image to the secondary image to identify an area of the image that needs correction for parallax. For example, since the second camera will also capture luminance, although the luminance may be of a lower resolution than that captured by the first camera, the image processing system may correlate the two luminance images to identify the parallax. Based on the correlation, the image processing system calculates a misalignment and corrects the parallax based on the calculated misalignment. For example, the image processing system may adjust the chrominance based on the calculated misalignment. According to another exemplary embodiment, the image processing system may correlate the luminance image and the chrominance image to identify the misalignment and correct the parallax. Since the human visual system provides less spatial resolution for chrominance, some misalignment in the registration of images, which is normally not acceptable by image registration applications, may be allowed.

According to an exemplary embodiment, the image processing system corrects occlusion. For example, parallax may also produce occlusions since, in some cases, it will not be possible to capture an object which exists behind another object. According to an exemplary embodiment, occlusion may be permitted to appear in chrominance. For example, if images that include occlusions are registered in chrominance, the image processing system may identify an occluded area of an image. In cases in which the occluded area lacking chrominance information has the same or nearly the same luminance as a neighboring area, it may be assumed that the color is the same or nearly the same. According to these cases, the image processing system may use the chrominance information associated with the neighboring area to extend to the occluded area.

According to an exemplary embodiment, object boundaries may be identified by edge detection of the luminance image and/or edge detection of the chrominance image. Additionally, portions of an object that are occluded may be assumed to have the same or nearly the same color. An example, of managing object boundaries is further described in FIGS. 4A-4F.

According to another embodiment, occlusion may be permitted to appear in luminosity. For example, if images that include occlusions are registered in luminance, the image processing system may use the luminance information captured by the second camera to fill in missing luminance information from an occluded area of an image. While the luminance information captured by the second camera may be a lower resolution (e.g., compared to the first camera), the difference in resolution may be visually acceptable, particularly since occlusions are generally very small areas of an image.

Embodiments of a dual camera may be implemented in a variety of user devices. By way of example, a user device may be implemented as a mobile device or a portable device, such as a smartphone, a personal digital assistant (PDA), a tablet device, a palmtop device, a laptop computer, a desktop computer, a netbook device, a camera, a music playing device, a gaming device, a cellular phone, etc.

Figure 2A:
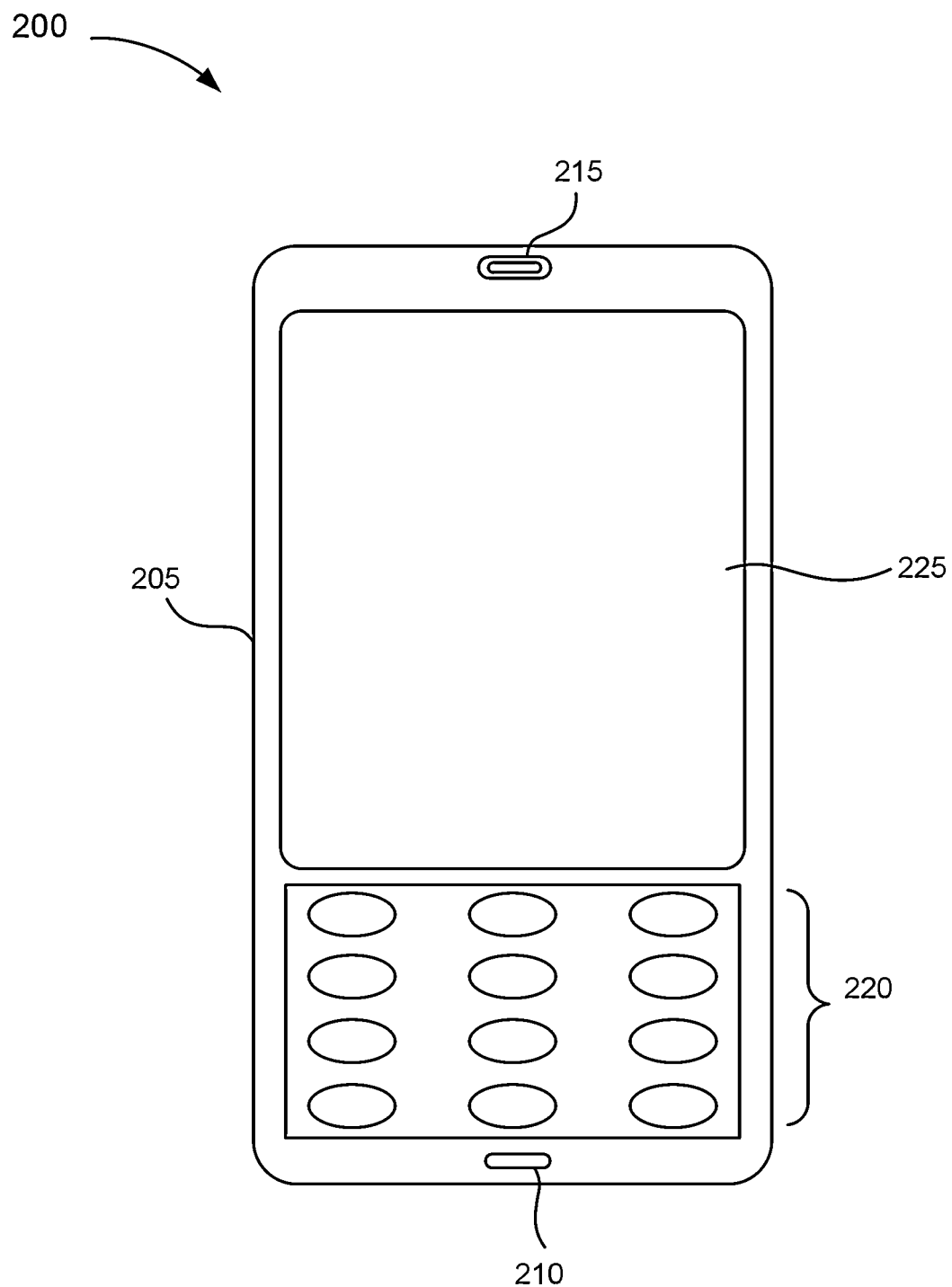
FIGS. 2A and 2B are diagrams illustrating an exemplary user device.
Figure 2B:
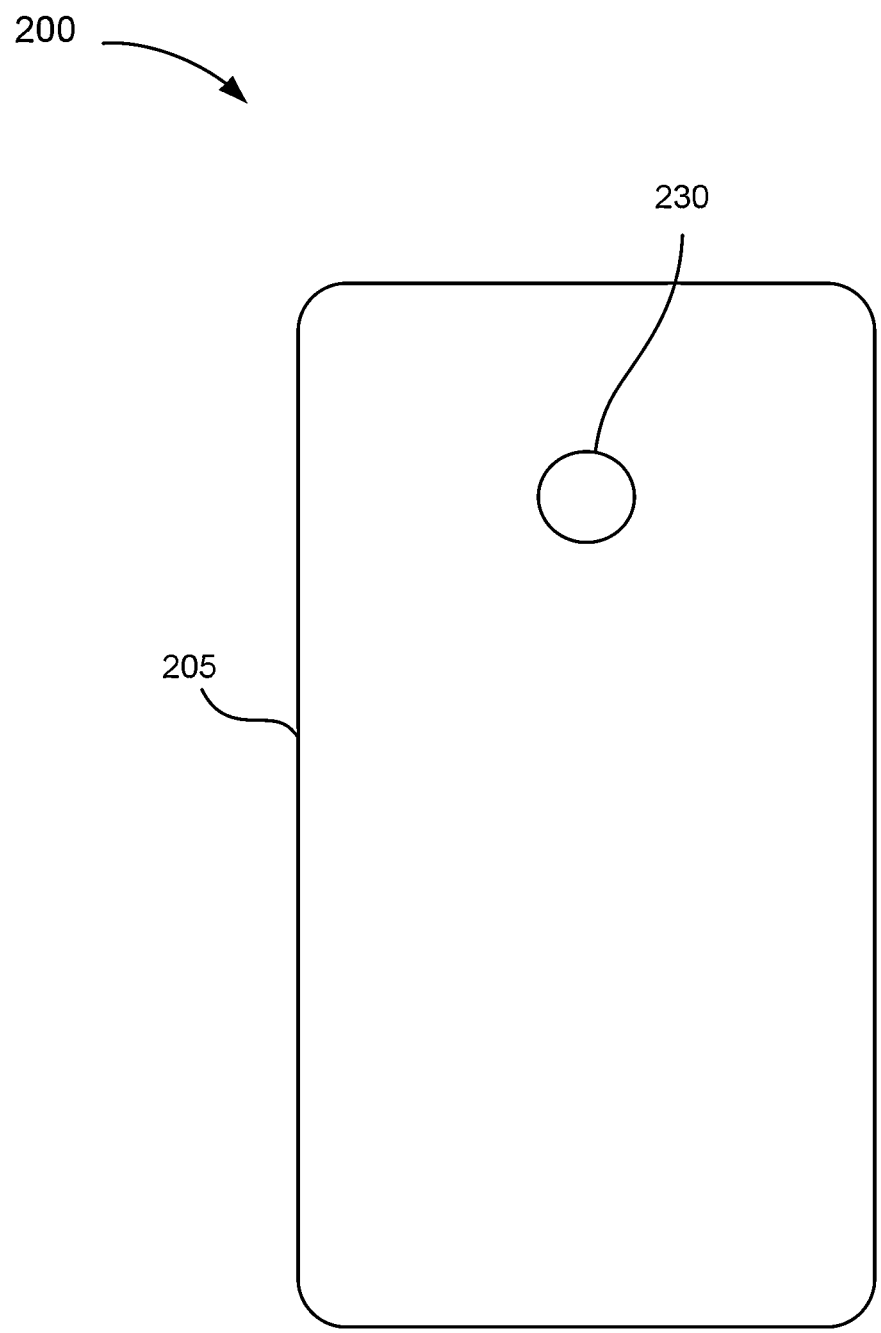

FIGS. 2A and 2B are diagrams illustrating an exemplary front side and back side of user device 200. As illustrated in FIG. 2A, user device 200 comprises a housing 205, a microphone 210, a speaker 215, keys 220, and a display 225. Referring to FIG. 2B, user device 200 comprises a dual camera 230. According to other embodiments, user device 200 may comprise fewer components, additional components, different components, and/or a different arrangement of components than those illustrated in FIGS. 2A and 2B, and described herein.

Housing 205 comprises a structure to contain components of user device 200. For example, housing 205 may be formed from plastic, metal, or some other type of material. Housing 205 may support microphone 210, speaker 215, keys 220, display 225, and dual camera 230.

Microphone 210 transduces a sound wave to a corresponding electrical signal. For example, a user may speak into microphone 210 during a telephone call or to execute a voice command. Speaker 215 transduces an electrical signal to a corresponding sound wave. For example, a user may listen to music or listen to a calling party through speakers 215.

Keys 220 provide input to user device 200. For example, keys 220 may comprise a standard telephone keypad, a QWERTY keypad, and/or some other type of keypad (e.g., a calculator keypad, a numerical keypad, etc.). Keys 220 may also comprise special purpose keys to provide a particular function (e.g., send, call, e-mail, etc.).

Display 225 may operate as an output component. For example, display 225 may comprise a liquid crystal display (LCD), a plasma display panel (PDP), a field emission display (FED), a thin film transistor (TFT) display, or some other type of display technology.

Additionally, according to an exemplary implementation, display 225 may operate as an input component. For example, display 225 may comprise a touch-sensitive screen. According to another implementation, display 225 may comprise a touchless screen. Display 225 may be capable of displaying text, pictures, videos, etc. Display 225 may also be capable of displaying various images (e.g., icons, objects, a virtual keypad, etc.) that may be selected by a user to access various applications, enter data, navigate through user interfaces, etc.

Figure 2C:
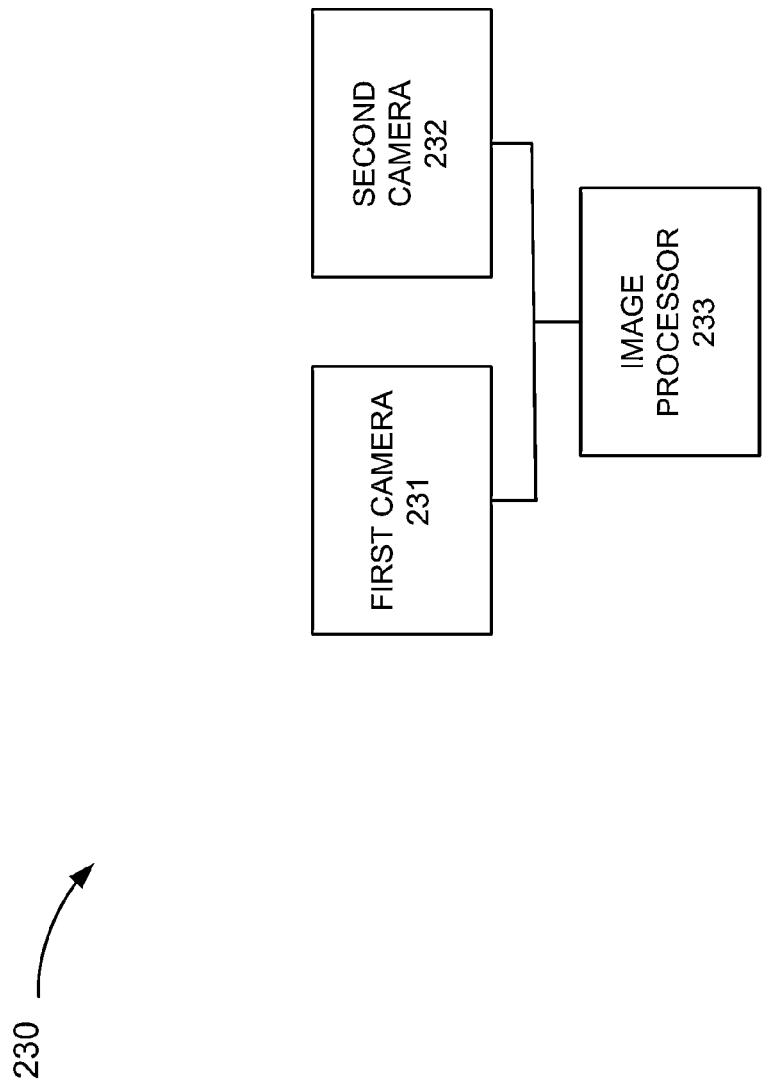
FIG. 2C is a diagram illustrating components of an exemplary dual camera.

Referring to FIGS. 2B and 2C, dual camera 230 comprises a first camera 231 and a second camera 232, as described herein. According to an exemplary embodiment, dual camera 230 provides 3-D functionality. For example, according to an exemplary implementation, first camera 231 and second camera 232 may be separated by approximately 25-35 millimeters (mm). According to another embodiment, dual camera 230 does not provide 3-D functionality. For example, according to an exemplary implementations, first camera 231 and second camera 232 are side-by-side (e.g., substantially less than 25 mm apart). For example, first camera 231 and second camera 232 may be separated by a distance around 10 mm or less.

As previously described, first camera 231 includes a sensor without a filter (e.g., a color filter array). Second camera 232 includes a sensor with a filter (e.g., a color filter array).

Image processor 233 includes logic that, among other things, corrects parallax and occlusion, as previously described.

Figure 3:
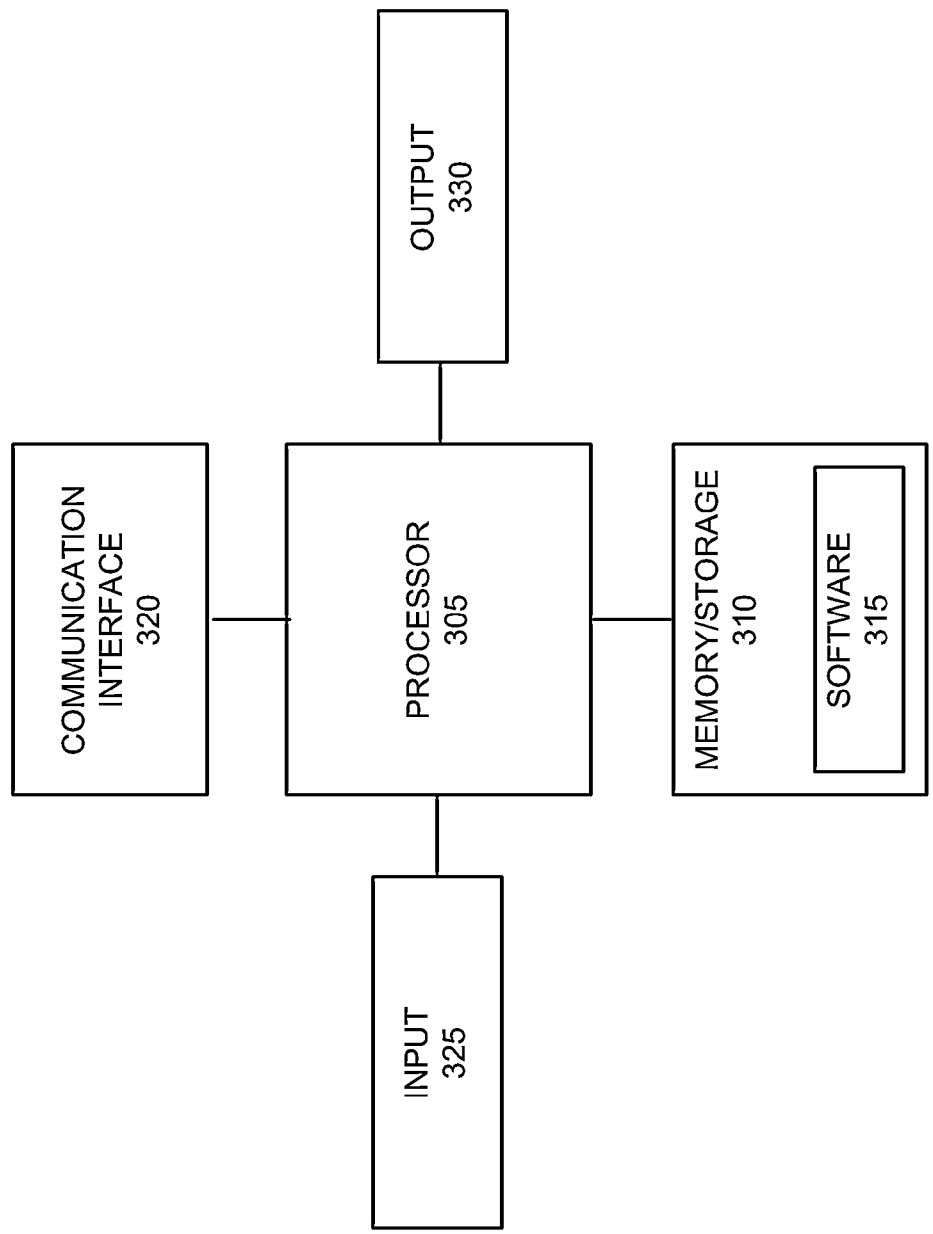
FIG. 3 is a diagram illustrating exemplary components of a user device.

FIG. 3 is a diagram illustrating exemplary components of user device 200. As illustrated, user device 200 may comprise a processor 305, a memory/storage 310 that may comprise software 315, a communication interface 320, an input 325, and an output 330. According to other embodiments, user device 200 may comprise fewer components, additional components, different components, or a different arrangement of components than those illustrated in FIG. 3 and described herein.

Processor 305 may comprise one or multiple processors, microprocessors, co-processors, application specific integrated circuits (ASICs), controllers, central processing units (e.g., one or multiple cores), programmable logic devices, chipsets, field programmable gate arrays (FPGAs), application specific instruction-set processors (ASIPs), system-on-chips (SoCs), microcontrollers, central processing units (CPUs), and/or some other component that may interpret and/or execute instructions and/or data. Processor 305 may be implemented as hardware (e.g., a microprocessor, etc.), a combination of hardware and software (e.g., a SoC, etc.), may include one or multiple memories (e.g., memory/storage 310), buses, etc.

Processor 305 may control the overall operation or a portion of operation(s) performed by user device 200. Processor 305 may perform one or more operations based on an operating system and/or various applications (e.g., software 315). Processor 305 may access instructions from memory/storage 310, from other components of user device 200, and/or from a source external to user device 200 (e.g., a network or another device).

Memory/storage 310 may comprise one or multiple memories. For example, memory/storage 310 may comprise a random access memory (RAM), a dynamic random access memory (DRAM), a read only memory (ROM), a static random access memory (SRAM), a single in-line memory module (SIMM), a dual in-line memory module (DIMM), a programmable read only memory (PROM), a flash memory, and/or some other type of memory. Memory/storage 310 may comprise a hard disk (e.g., a magnetic disk, an optical disk, a magneto-optic disk, a solid state disk, etc.) along with a corresponding drive.

Memory/storage 310 may be external to and/or removable from user device 200, such as, for example, a Universal Serial Bus (USB) memory, a dongle, a hard disk, mass storage, off-line storage, or some other type of storing medium (e.g., a compact disk (CD), a digital versatile disk (DVD), a Blu-Ray™ disk (BD), etc). Memory/storage 310 may store data, software, and/or instructions related to the operation of user device 200.

Software 315 includes an application or a program that provides one or multiple functions or processes. Software 315 may include various forms of firmware (e.g., microcode, data, machine code, etc.).

Communication interface 320 may permit user device 200 to communicate with other devices, networks, and/or systems. For example, communication interface 320 may comprise one or multiple wireless and/or wired communication interfaces. Communication interface 320 may comprise a transmitter, a receiver, and/or a transceiver. Communication interface 320 may operate according to various protocols, communication standards, or the like.

Input 325 may permit an input into user device 200. For example, input 325 may comprise a microphone (e.g., microphone 210), keys (e.g., keys 220), a display (e.g., display 225 that includes a touchscreen), a touchpad, a button, a switch, a camera, an input port, voice recognition logic, fingerprint recognition logic, a web cam, a mouse, a keyboard, and/or some other type of visual, auditory, tactile, etc., input component. According to an exemplary embodiment, input 325 includes dual camera 230.

Output 330 may permit user device 200 to provide an output. For example, output 330 may comprise speakers (e.g., speakers 215), a display (e.g., display 225), one or more light emitting diodes (LEDs), an output port, a vibratory mechanism, and/or some other type of output component. According to an exemplary embodiment, output 330 includes dual camera 230.

User device 200 may perform operation(s) and/or process(es) in response to processor 305 executing instructions (e.g., software 315) stored by memory/storage 310. For example, the instructions may be read into memory/storage 310 from another memory/storage 310 or from another device via communication interface 320. The instructions stored by memory/storage 310 may cause processor 305 to perform one or more processes described herein. Alternatively, for example, user device 200 may perform one or more processes based on the execution of hardware (e.g., processor 305, etc.), the execution of hardware and firmware, or the execution of hardware, software (e.g., software 315), and firmware.

Figure 4A:
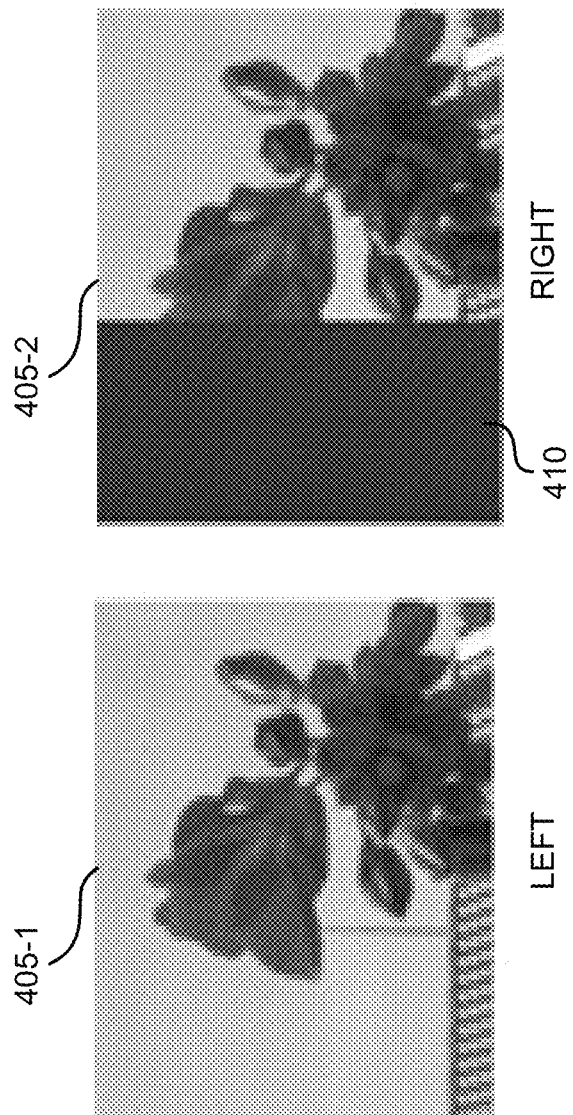
FIGS. 4A-4F are diagrams illustrating an exemplary process for correcting occlusion based on chrominance information.

FIGS. 4A-4F are diagrams illustrating an exemplary image process performable by an exemplary embodiment of dual camera 230. In this example, a small region of a scene is used to illustrate how lost chrominance data may be restored. Referring to FIG. 4A, a left image 405-1 and a right image 405-2 is depicted in which left image 405-1 is a scene in front of first camera 231 and right image 405-2 is a scene in front of second camera 232. Right image 405-2 includes an obstruction 410 in the scene.

Figure 4B:
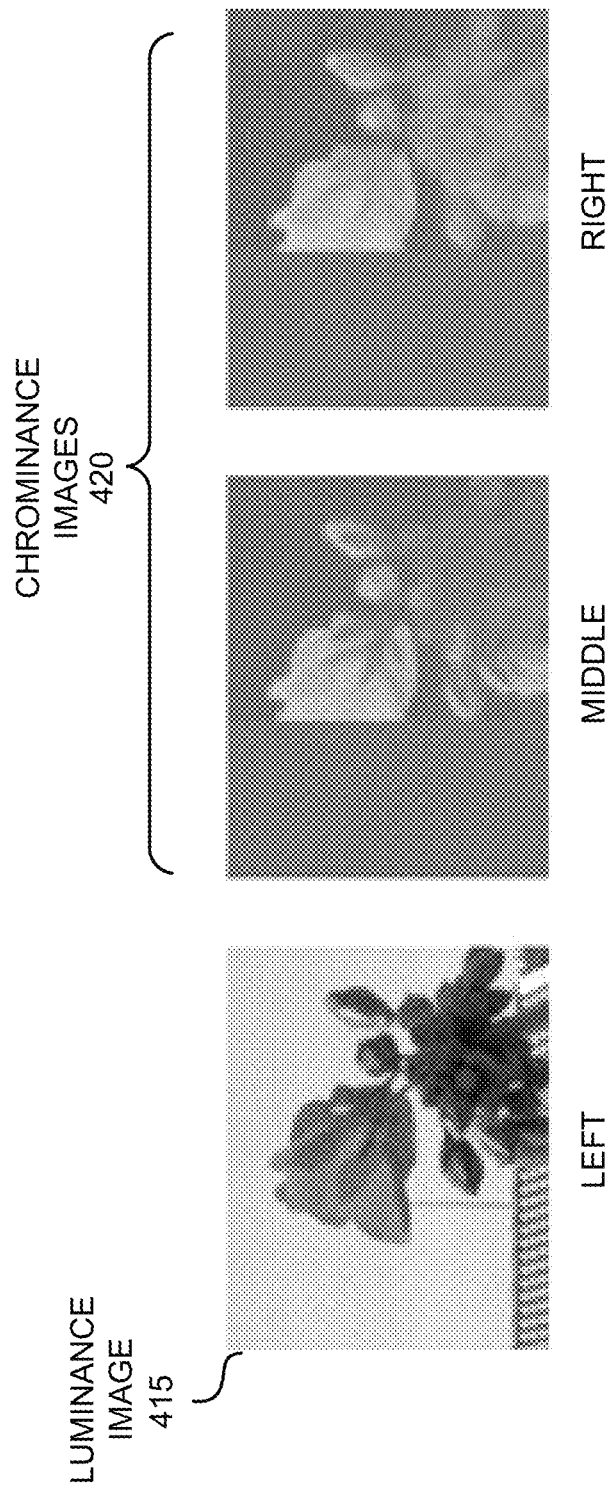

In FIG. 4B, a luminance image 415 is captured by first camera 231 and chrominance images 420 are captured by second camera 232. The middle chrominance image 420 and the right chrominance image 420 correspond to color channels (or chrominance channels) A and B of second camera 232.

Figure 4C:
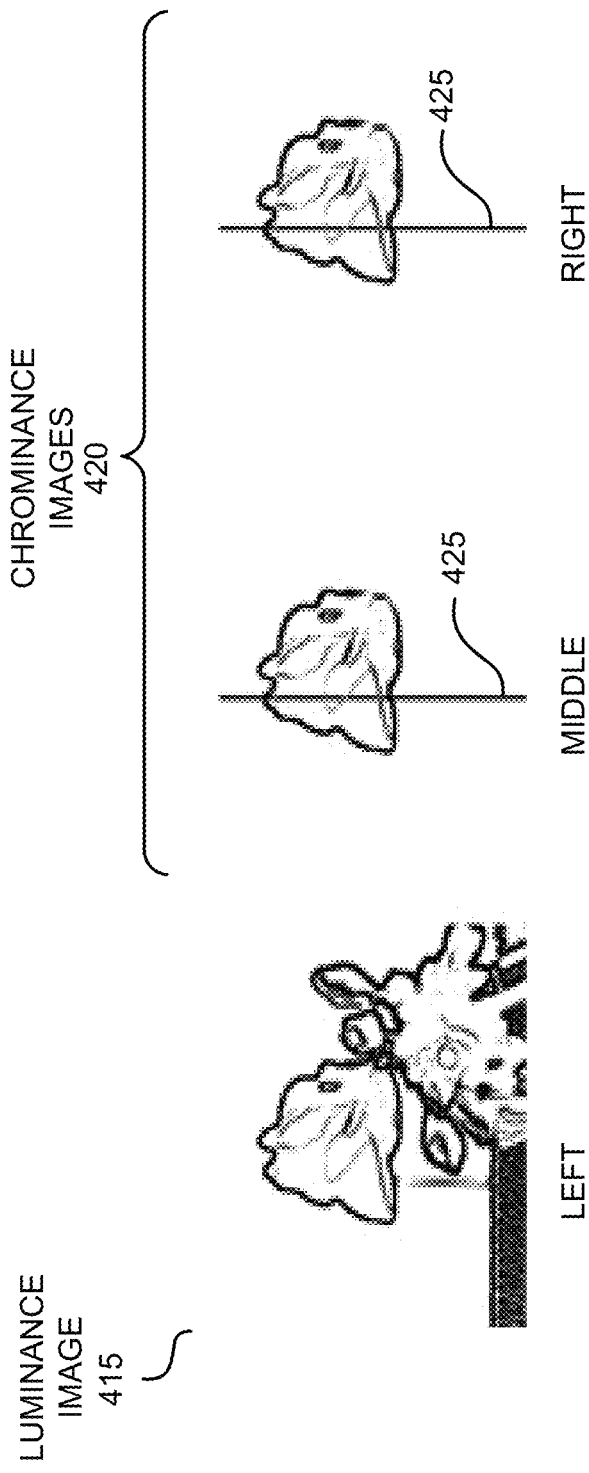
Figure 4D:
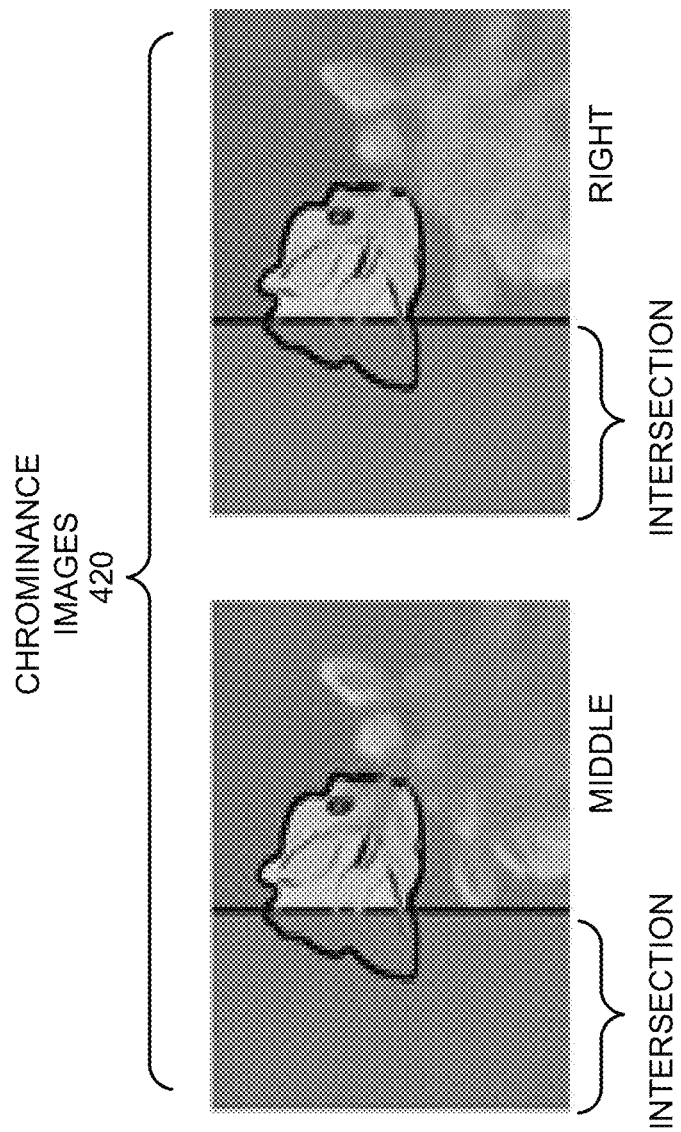
Figure 4E:
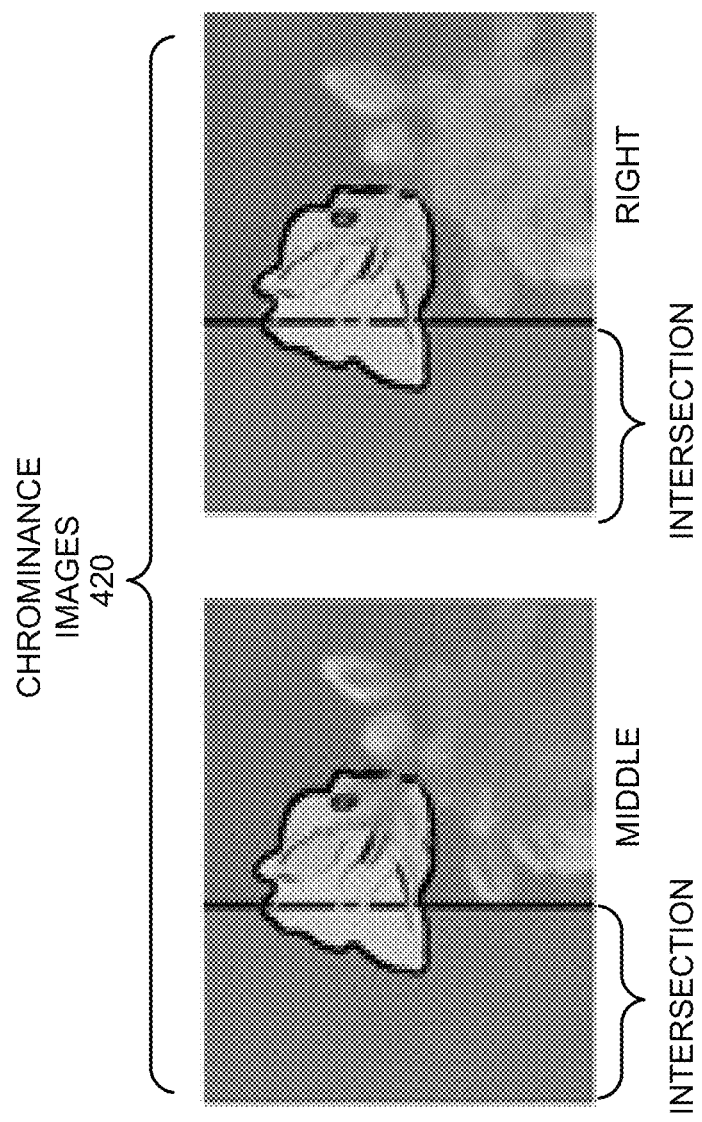
Figure 4F:
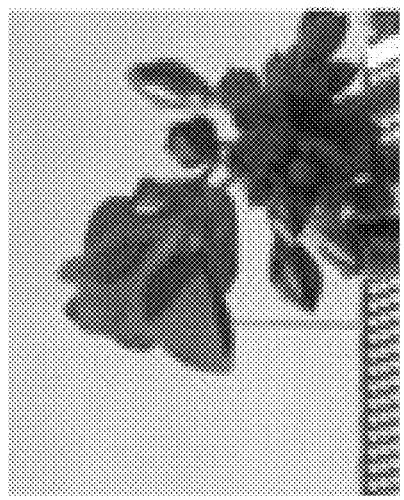
Figure 4F:
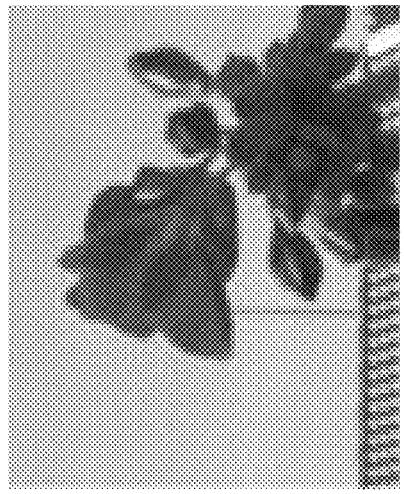

As illustrated in FIG. 4C, an edge detection algorithm is applied to luminance image 415. For example, the edge detection algorithm may be a search-based edge detection algorithm (e.g., gradient, etc.) or a zero-crossing-based algorithm (e.g., Laplacian, etc.). In chrominance images 420, an object (e.g., a flower) that is partly hidden by obstruction 410 is identified as a vertical line 425 representing a border between obstruction 410 and the unobscured portion of the object. Referring to FIG. 4D, a region in the two chrominance channels (A and B) that is an intersection of the obscuring and the obscured object is identified. This intersection is rendered with the same color information as the unobscured portion of the object. In FIG. 4E, the intersection is filled with chrominance data based on the data from the unobscured portion of the object. Variations in tone of the object are primarily due to changes in luminance while the chrominance is quite "flat." For example, the chrominance data may be an average or a median of the values of the unobscured portion of the object. As illustrated in FIG. 4F, the left image is the reconstructed image in which the flower is processed. The background (e.g., the sky) and other objects in the scene may be processed in a similar manner. The right image represents the actually scene.

The foregoing description of implementations provides illustration, but is not intended to be exhaustive or to limit the implementations to the precise form disclosed. Modifications and variations are possible in light of the above teachings or may be acquired from practice of the teachings. For example, embodiments may be modified to include an array camera comprising three cameras, in which two cameras are designed to capture chrominance and the other camera is designed to capture luminance. According to an exemplary embodiment, the luminance camera (e.g., having a sensor without a color filter array) is positioned in the middle or between the two chrominance cameras. The tertiary array camera may be oriented horizontally or vertically. According to such an embodiment, the occurrence of occlusion may be managed without any loss. For example, an occlusion appearing in an image captured by a left-positioned chrominance camera may be compensated by an image captured by a right-positioned chrominance camera. According to an exemplary implementation, chrominance data associated with an image captured by the right-positioned chrominance camera may be used to fill-in the chrominance data of an obscured object of an image captured by the left-positioned chrominance camera.

The terms "comprise," "comprises," "comprising," as well as synonyms thereof (e.g., include, etc.), when used in the specification is taken to specify the presence of stated features, integers, steps, or components but does not preclude the presence or addition of one or more other features, integers, steps, components, or groups thereof. In other words, these terms mean inclusion without limitation.

With respect to processes described in this description, the order of operations may be different according to other implementations, and/or operations may be performed in parallel.

The embodiments of a dual camera herein may be implemented in many different forms of software and/or firmware executed by hardware. For example, a process or a function performed by image processor 233 may be implemented as "logic" or as a "component." This logic or this component may include, for example, hardware (e.g., processor 305, etc.), a combination of hardware and software (e.g., software 315), a combination of hardware and firmware, or a combination of hardware, software, and firmware. The embodiments have been described without reference to the specific software code since software can be designed to implement the embodiments based on the description herein. Additionally, a non-transitory storage medium may store instructions, which when executed, may perform processes and/or functions pertaining to the exemplary embodiments described herein. The non-transitory storage medium includes memory/storage 310.

The article "a," "an," and "the" are intended to mean one or more items. Further, the phrase "based on" is intended to mean "based, at least in part, on" unless explicitly stated otherwise. The term "and/or" is intended to mean any and all combinations of one or more of the listed items.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction used in the present application should be construed as critical or essential to the implementations described herein unless explicitly described as such.

What is claimed is:

1. A user device comprising:
a dual camera including a first camera and a second camera, wherein the first camera includes a first image sensor to capture luminance, and wherein the first image sensor does not include a color filter array, and the second camera includes a second image sensor to capture chrominance, wherein the second image sensor includes a color filter array;
an image processor comprising:
a memory, wherein the memory is configured to store instructions; and
a processor, wherein the processor is configured to execute the instructions to:
identify an occluded area within an image captured by the second camera;
identify an area neighboring the occluded area within the image captured by the second camera; and
use chrominance data of the identified area neighboring the occluded area within the image captured by the second camera to correct the chrominance within the occluded area.

2. The user device of claim 1, wherein the first camera and the second camera are separated by a distance approximately between 25 millimeters and 35 millimeters.

3. The user device of claim 1, wherein the first image sensor includes a filter that corrects a difference between the first image sensor's spectral sensitivity and a photopic luminosity function.

4. The user device of claim 1, wherein the processor is further configured to execute the instructions to:
apply edge detection to an image captured by the first camera;
identify an obstructed portion of an object in the image captured by the second camera based on the edge detection of the object in the image captured by the first camera; and
use chrominance data associated with an unobstructed portion of the object as chrominance data for the obstructed portion of the object.

5. The user device of claim 4, wherein the processor is further configured to execute the instructions to:
identify the unobstructed portion of the object; and
use average values of the chrominance data associated with the unobstructed portion of the object.

6. The user device of claim 1, wherein the first camera and the second camera are separated by a distance of 10 millimeters or less.

7. The user device of claim 1, wherein the user device includes a wireless telephone.

8. The user device of claim 1, wherein the color filter array is a Bayer filter.

9. A method comprising:
capturing luminance of an image by a first camera that does not include a color filter array;
capturing chrominance of an image by a second camera that includes a color filter array, wherein a dual camera comprises the first camera and the second camera;
identifying an occluded area within the image captured by the second camera;
identifying an area neighboring the occluded area within the image captured by the second camera; and
using chrominance data of the identified area neighboring the occluded area within the image captured by the second camera to correct the chrominance within the occluded area.

10. The method of claim 9, further comprising:
correlating a first luminance image to a second luminance image, wherein the image captured by the first camera includes the first luminance image, and the image captured by the second camera includes the second luminance image;
calculating a misalignment between the first and second luminance images; and
adjusting chrominance data of the image captured by the second camera based on the calculating.

11. The method of claim 10, further comprising:
applying edge detection to the image captured by the first camera;
identifying an obstructed portion of an object in the image captured by the second camera based on the edge detection of the object in the image captured by the first camera; and
using chrominance data associated with an unobstructed portion of the object as chrominance data for the obstructed portion of the object.

12. The method of claim 11, further comprising:
identifying the unobstructed portion of the object; and
using average values of the chrominance data associated with the unobstructed portion of the object.

13. A method comprising:
capturing luminance of an image by a first camera that does not include a color filter array;
capturing chrominance of an image by a second camera that includes a color filter array, wherein a dual camera comprises the first camera and the second camera;
correlating a first luminance image to a second luminance image, wherein the image of the first camera includes the first luminance image, and the image of the second camera includes the second luminance image;
calculating a misalignment between the first luminance image and the second luminance image;
adjusting chrominance data of the image captured by the second camera based on the calculated misalignment;
applying edge detection to the image captured by the first camera;
identifying an obstructed portion of an object in the image captured by the second camera based on the edge detection of the object in the image captured by the first camera; and
using chrominance data associated with an unobstructed portion of the identified object as chrominance data for the obstructed portion of the object in the image captured by the second camera.

14. The method of claim 13, further comprising:
applying edge detection to the image captured by the second camera; and
identifying the obstructed portion of the object in the image captured by the second camera based on the edge detection of the object in the image captured by the second camera.

15. The method of claim 13, further comprising:
using average values of the chrominance data associated with the unobstructed portion of the object.

16. The method of claim 13, wherein an exposure time of the first camera is different from an exposure time of the second camera.

17. The method of claim 13, wherein the color filter array is a Bayer filter.

18. The user device of claim 1, wherein the processor is further configured to execute the instructions to:
correlate a luminance image captured by the first camera to a luminance image of the image captured by the second camera;
calculate a misalignment between the luminance images; and
adjust chrominance data of the image captured by the second camera to correct a parallax.

19. The user device of claim 4, wherein the processor is further configured to execute the instructions to:
apply edge detection to the image captured by the second camera; and
identify the obstructed portion of the object in the image captured by the second camera based on the edge detection of the object in the image captured by the second camera.

20. The method of claim 9, further comprising:
applying edge detection to the image captured by the second camera; and
identifying an obstructed portion of an object in the image captured by the second camera based on the applying; and
using chrominance data associated with an unobstructed portion of the object as chrominance data for the obstructed portion of the object.

* * * * *